United States Patent
Bennett

(10) Patent No.: US 8,229,911 B2
(45) Date of Patent: Jul. 24, 2012

(54) NETWORK SEARCH ENGINE UTILIZING CLIENT BROWSER ACTIVITY INFORMATION

(75) Inventor: James D. Bennett, Hroznetin (CS)

(73) Assignee: Enpulz, LLC, Chicago, IL (US)

( * ) Notice: Subject to any disclaimer, the term of this patent is extended or adjusted under 35 U.S.C. 154(b) by 329 days.

(21) Appl. No.: 12/415,711

(22) Filed: Mar. 31, 2009

(65) Prior Publication Data

US 2009/0287657 A1    Nov. 19, 2009

Related U.S. Application Data

(60) Provisional application No. 61/052,897, filed on May 13, 2008.

(51) Int. Cl.
*G06F 17/30* (2006.01)
(52) U.S. Cl. ........ 707/706; 715/769; 707/707; 707/708; 707/709; 707/710
(58) Field of Classification Search .................. 707/748, 707/706–710; 715/769
See application file for complete search history.

(56) References Cited

U.S. PATENT DOCUMENTS

| | | | | |
|---|---|---|---|---|
| 7,603,437 | B2 * | 10/2009 | Busey | 709/219 |
| 7,827,170 | B1 * | 11/2010 | Horling et al. | 707/722 |
| 2002/0103789 | A1 * | 8/2002 | Turnbull et al. | 707/3 |
| 2005/0076003 | A1 * | 4/2005 | DuBose et al. | 707/1 |
| 2007/0250514 | A1 * | 10/2007 | Rajput et al. | 707/10 |
| 2009/0164929 | A1 * | 6/2009 | Chen et al. | 715/769 |
| 2009/0287656 | A1 * | 11/2009 | Bennett | 707/3 |
| 2009/0287683 | A1 * | 11/2009 | Bennett | 707/5 |
| 2011/0113100 | A1 * | 5/2011 | Chawla | 709/205 |

* cited by examiner

*Primary Examiner* — Shahid Alam
*Assistant Examiner* — Tina Huynh
(74) *Attorney, Agent, or Firm* — Garlick & Markison; Bruce E. Garlick

(57) ABSTRACT

An Internet infrastructure that supports searching of web links selects search results by processing browser activity information along with one or more of favorite lists, and related metadata, user profiles, and trends based on browser activity behavior and favorite behavior. The Internet infrastructure consists of a plurality of web browsers located on client devices. The web browsers are incorporated with a browser activity-monitoring module that tracks user's Internet usage, processes this information, and sends this information periodically or upon user request to the server to aid in improving search operation results. The search engine server is communicatively coupled to the plurality of web browsers and supports delivery of search results/web links to the client device based upon a search string, browser activity information, and possibly the favorite lists and related metadata. The search engine server stores the gathered browser activity information, favorite lists, and related metadata in one or more server database that is associated with the search engine server, and delivers search results.

15 Claims, 8 Drawing Sheets

805

Search Engine's Web Page (www.Search_Engine.com) 821

Enter Search String: 823 | Top Bicycle Riders 825 | 827    [Search] 837

⦿ Search Within Favorites  ⦿ Search Using Browser Activity  ⦿ Search Using Trends
   829                        833                              835

| Search Results Within World's Favorites: 841 | Search Results Using Browser Activity: 843 |
|---|---|
| 1. Www.bicycleriders.com 851 | 1. Top Bicycle Riders [Popularity: 1] 861 |
| 2. Mountain Drive 852 | 2. My list of top riders [Popularity: 2] 862 |
| 3. Tail Rider View 853 | 3. I found top bicycle... [Popularity: 3] 863 |
| 4. Bicycles for Sale 854 | 4. I love bicycles... [Popularity: 4] 864 |
| 5. ABC.com/Bicycle 855 | 5. Bicycle Riding [Popularity: 5] 865 |
| 6. Touring with Bicycle Riders 856 | 6. Bicycle Riders [Popularity: 6] 866 |
| ... | ... |

[Prev] 885    [Next] 889

Note: This Search Engine also searches within World's Favorite Lists and using Browser Activity, if chosen. Trend button allows recently added and high visit volume preferences to come to the top of the Search List. 893

Client's Browser 895

FIG. 8

NETWORK SEARCH ENGINE UTILIZING CLIENT BROWSER ACTIVITY INFORMATION

CROSS REFERENCES TO PRIORITY APPLICATIONS

The present application claims priority under 35 U.S.C. 119(e) to U.S. Provisional Application Ser. No. 61/052,897, filed May 13, 2008, and having a common title with the present application, which is incorporated herein by reference in its entirety for all purposes.

BACKGROUND

1. Technical Field

The present invention relates generally to Internet clients and servers; and, more particularly, to search engines operating on the Internet.

2. Related Art

Search engines deliver search results based upon a search string. Searching can help users find their way around Internet, which contains billions of web pages, or can help users narrow large amounts of information down to workable subsets of meaningful information that is relevant to the user's interest. Only a very few of the billions of web pages on the Internet are useful to a user, depending upon what a user is looking for at any given time. A user may look for web pages with a variety of interests such as business, medical, social, engineering, and scientific research as well as home-based general or personal interests. Search engines usually select web links based upon a search keyword (or, search phrase or search string) and often orders search results based on the rank-ordered popularity of the web links with each other.

Typically, users look for web links that contain useful information with certain user expectations. The specific expectations may relate to specific business, engineering and scientific organizations, medical, help groups, web sites designed to impart knowledge, email web sites, or other information. However, the delivered search results are often not in accordance with the user's expectations, and the user's expectations are significantly different from the search results that the search engine delivers to the user. Search results that are delivered are often vaguely related to what the user is looking for, if related at all.

Popular web sites are pushed up to the top of the search result lists, assuming that all users who use the same or similar keywords have same expectations in mind as other users who visited the more popular sites. Often, this turns out to be a disappointment for many users because many users are in minorities when it comes to expectations and interest and it is not always a good assumption to believe all users have the same interests and expectations for a search. This assumption does not hold true most of the time. Thus, users waste a lot of time browsing through unwanted, uninteresting, and/or junk web sites before they can find one web site that is in some way is closer to what they are looking for (if they find any relevant sites at all). The user may never find the few web sites among billions of web pages that provide exact information regarding what they are searching for, because some of these pages may not be popular or may not immediately correlate well with the search string. Therefore, none of these meaningful web sites or search results ever makes it to the top of the search result list.

A user may often look for information within certain area of interest, and they may exhibit trends, habits, or patterns of looking for similar information or related information to a core set of interests over time. Unaware of user's interests, search engines deliver web links that are vaguely associated with user's area of interest, if associated at all. For example, a user may enter a search string 'top bicycle riders'. The user may be looking for a list top ranked bicycle riders in world. Unaware of user's area of interest (that is, bicycle racing; and that the user is looking for top ranked bicycle riders worldwide), a search engines may deliver web links of top bicycle magazines, bicycle sellers, resellers and renters, bicycle touring in a remote holiday resort, etc. Unable to find what he/she is looking for, the user clicks on 'next' button again and again to scan ever deeper into the search results list, often getting same unsatisfactory results.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 8 is a schematic diagram illustrating a snap shot of a first search result page based upon a search string, favorite lists and related metadata, trends, and browser activity information.

DETAILED DESCRIPTION OF THE DRAWINGS

Figure 1:
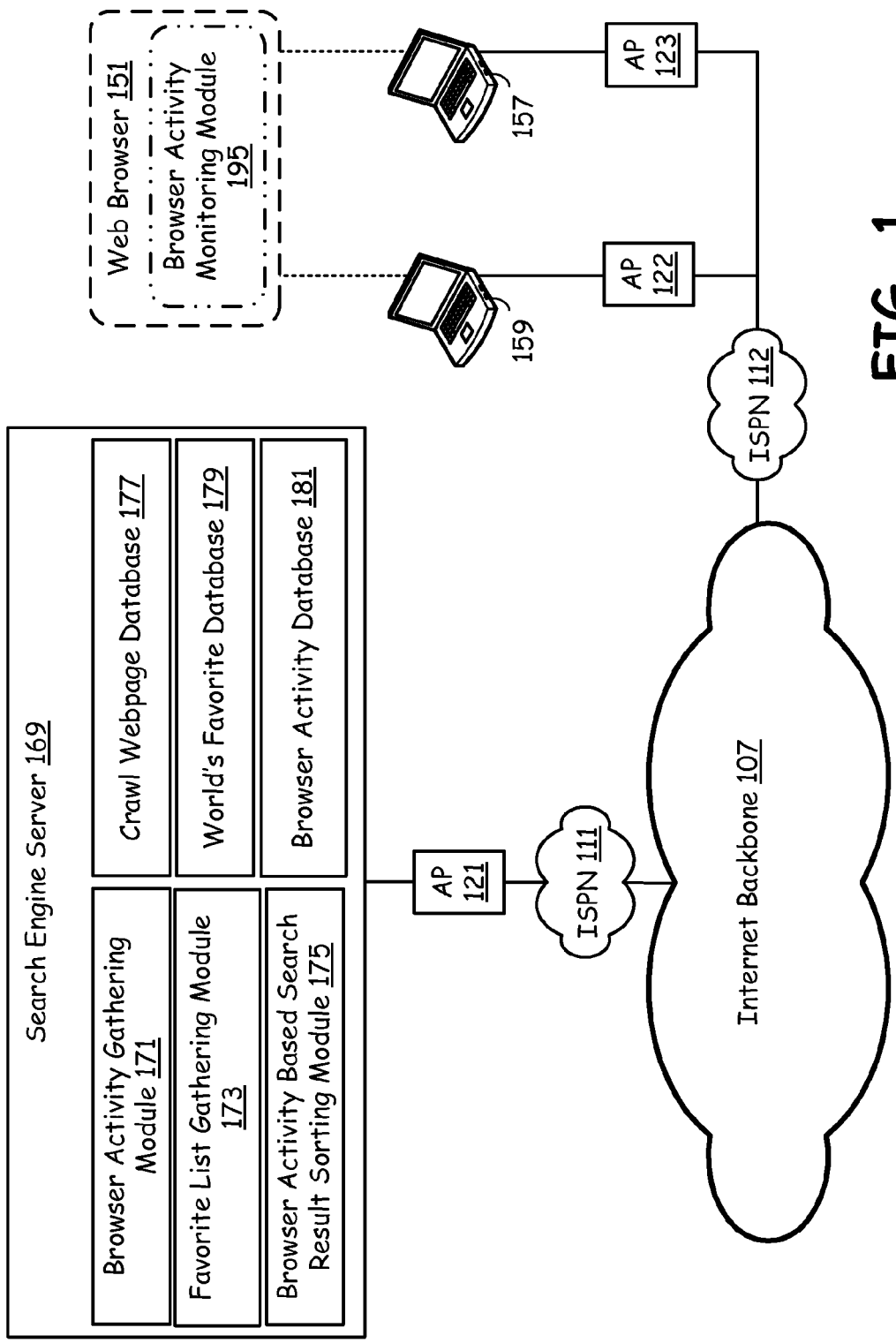
FIG. 1 is a schematic block/step diagram illustrating an Internet infrastructure containing a plurality of client devices and web browser accessible search engine server, wherein the search engine server delivers web links based upon browser activity information gathered from client devices.

FIG. 1 is a schematic block/step diagram illustrating an Internet infrastructure 105 containing a plurality of client devices 157 through 159 and at least one web browser accessible search engine server 169. In FIG. 1, the search engine server 169 delivers search results or web links based upon browser activity information gathered from a browser activity monitoring module 195 incorporated into web browsers 151 of the plurality of client devices 157 through 159. In specific, the browser activity monitoring module 195 tracks user's Internet activities, such as a time at which a webpage is visited, duration for which a webpage is visited, the kind of interaction performed with a web site, the content accessed in the web site (ads, movies, text, PDF, audio, etc), the amount of clicks or level of interaction with the web site, the number of sub-URLs visited within a parent web site, and/or number of times a webpage is revisited. The module 195 sends this compiled browser activity information to the search engine server 169 periodically, upon a trigger event (like the start of a search), or upon user request(s). The search engine server 169 stores the gathered browser activity information and tailors the search results based upon this information. Then, the search engine server 169 delivers the results to the web browser 169, along with search results that are obtained using word matching in general, using favorite lists, and popular search trends from this user or other users.

Said another way, the search engine server 169 collects the user's browser activity information along with a favorite list used by the user and related client/user/browser metadata from each of the plurality of client devices 157 through 159 during its interaction with the client device 157 or 159, such as during a search interface webpage delivery (the time the server delivers a web page to the client to start or enable search operations). The search interface webpage contains interfaces useful for a user to search the Internet or another network using a search string and the search interface web page contains interfaces to edit favorite lists and send favorite list(s) data to the server along with browser activity information (for more details refer to the detailed description with reference to the FIG. 7). Then, the search engine server 169 processes this information during search operations before delivery of each of the search result pages and refines the search results according to information derived from the favorites, trends, metadata, and historical user/browser activity. Based upon the favorite list and related metadata, and browser activity information, the search engine server generates user profiles and trends that can be used to refine search results and search operations.

Furthermore, the search engine server tailors the search results and/or user advertisements based upon: (a) browser activity information; (b) favorite lists and related metadata; (c) the search string and/or information parsed therefrom; (d) a user profile created from browser activity information, and favorite list and related metadata; and (e) trends that are derived based upon favorite behavior and browser activity behavior. The search string or information parsed or derived therefrom may be matched with web contents in a crawl web page database 177, a world's favorite database 179, and/or a browser activity database 181. The crawl webpage database 177 contains a collection of all of the web pages hosted by a plurality of web hosting servers across the Intranet (the servers are not specifically shown in FIG. 1). The web pages within the database 177 are obtained by having a server crawl from web page to web page over the Internet, or by user submission to the server. The world's favorite database 179 contains web pages and related metadata (such as time at which a favorite webpage is visited, duration for which the favorite webpage is visited and number of times the favorite webpage is revisited) gathered from the web browsers 151 of the plurality of client devices 157 through 159. Therefore, the database 179 contains favorite sites visited by one user or a plurality of users, and the users may be grouped together by common profiles, interest, search patterns, may be statistically linked to each other, or may be grouped randomly together. The browser activity database 181 contains browser activity information such as webpage visited (either via a search process or directly), time at which the webpage is visited, duration for which the webpage is visited, number of times the webpage is revisited (hit count), etc (as discussed previously).

The search engine server 169 is able to process data in the world's favorite database 179 and/or browser activity database 181 to determine (from browser activity information, favorite lists and metadata) many possible interpretations of the resident data, such as: (a) a web link may be added to a favorite list, but may not be revisited by the user at all (if a web site or search result is in the favorite list but hit count is very low, the web page is likely not a true favorite); (b) a webpage may have been visited by many users, but the various durations of the visits are very small (this profile may indicate a junk or popup site that was unexpectedly and undesirable encountered by a user in a repeated manner); (c) a webpage is visited for long duration and visited many times, though may not be in favorite list (possibly, a true favorite that is simply not saved in a favorites list, could be the home page for example); (d) a webpage that is visited many times via searching, but duration is low (e.g., an accidentally visited website that had little or no interest to the user in the end); (e) a webpage is visited via manually entering the site address (the address is known to the users by some other means, not searched), etc. Such processing enables the search engine server 169 to tailor search results and advertisements to the user needs based on interpretation of data in the various databases 177, 179, and 181.

The browser-activity-monitoring module 195 on the clients in FIG. 1 collects and sends browser activity information, periodically, upon a trigger event, or upon a user request, to the search engine server 169 for storing and further processing. Note the module 195 may be a shared module between several clients or may be independent copies of the same or similar program/function on each client device. Alternatively, the browser-activity-monitoring module 195 may also perform pre-processing to reduce the volume of data sent to the server so that the data can be more easily consumed by the search engine server 169, via many client sources. For example, the browser activity monitoring module 195 may perform only a daily summary of only high volume visits, the module 195 may generate monthly, yearly, or lifetime summaries for the server, or the module 195 may remove interactions associated with pop-ups, adware, virus programs, other malware, quickly closed pages, certain illegal or restricted content (e.g., adult content, or content know to be violating copyright rights through digital rights management monitoring), etc.

The search engine server 169 of FIG. 1 generates a search result page for review by the user at a client device. This search result page (or pages) contains, in part or full, search result web links selected for presentation to the user on the basis of: (a) matching words, patterns, or phrases of search string with that of webpage contents only from crawl webpage database 177; (b) matching words, parsed data, etc., of search string with that of webpage contents only from world's favorite database 179; (c) matching words, etc., of search string with that of webpage contents only from browser activity database 181; (d) matching words, etc., of search string with that of contents from an advertisement database (not specifically shown in FIG. 1 but operating similarly to databases 177-181, but for advertisement and commercial content); (e) user profile(s) created using favorite list, related metadata, and browser activity information; (f) trends based on favorite behavior and browser activity behavior; (g) persistence information; and/or (h) combinations of (a)

through (g). Each of the search result lists sent to the user to satisfy a search operation thus obtained from (a) through (g) are also sorted on the basis of popularity or one some other rank-ordered characteristic (e.g., age of content, location, data size, date of creation or last edit, etc). All of the web links thus selected from (a) through (g), and sorted via some characteristic, may be delivered separately in each search result page or may be mixed together from the different sources (a) through (g) to form less number of lists and delivered in one or more columns to the user. In addition, the user may be provided with some flexibility in deciding which of the combinations of (a) through (g) is delivered in a search result page, and this can be set dynamically by a user input to a client window, a control panel, a software or hardware setting, interfacing to the operating system (OS), etc. The favorite list related metadata as well as browser activity information may include 'times visited', 'date added' and 'active duration of interaction with the site' or other relevant data to allow search operations to be refined and improved over time.

A user profile may be developed immediately upon reception of updated or current favorite list(s) and related metadata, and/or browser activity information. The user profile may be developed using the favorite list and related metadata and/or browser activity information obtained during delivery of the search interface web page or as updated in another manner from time to time. As one example, a user may often visit web links (some of which may be selected from the favorite list, while some others may be entered via direct entry into a address/URL text box or through search hyperlinks) in the area of commerce, some other in the area of news, and a few more on a personal topic of interest (such as an NBA site, mail related web sites, banking web sites, financial news web sites) etc. In addition, the favorite list related metadata and browser activity information may contain useful data that indicates that the user mostly uses Internet for browsing between certain times (e.g., from 9 am to 5 pm), and visits commerce related web links (such as stock related websites) 80% of the time and news related web sites 10% of the time from Monday through Friday, but not on weekends, etc. The search engine server 169, in this case, is able to construct a user profile that includes all of the user browsing behavior as related to the favorite list and related metadata and browser activity information. An example profile or trend with capture information such as: (a) User's Area of Interests: Commerce, Business News and Personal; (b) Visiting Hours for Science: 9 am to 5 pm, Most Viewed Web Site: 'XYZ.com', Percentage of Time Dedicated to 'XYZ.com': 70% etc. From this user profile and/or trends, the search engine server 169 may determine that if the search string received during a search is related to the area of commerce, the user is likely to be interested in many of the commerce related web links that others have visited that have similar interests, profiles, or trends to the user. If a user with a similar trend pattern or profile often visits certain sites in the subject matter area of this search, then the server can choose to deliver such web links either separately or mixed with other lists mentioned above for review by the current user. In other words, the server can assume that users that have similar profile and similar browse histories, behaviors, favorites, interaction with the browser, etc., may be looking for similar content when searching in similar areas via a search string.

The trends that use favorite behavior and browser activity behavior allows the search engine server 169 to reorder the search result list, based upon, for example, recently added and high visit volume preferences. The search engine server 169 may push some of these recently added and high visit web links to the top of the list. In addition, the search engine server 169 may process the data stored in the world's favorite database 179 and browser activity database 181 to determine search hit probability by applying weighting factors (a modified natural language search) to different favorites, trends, user interactions, etc. A few of the factors that may be used to determine a weighting factor are: (a) number of users tagging a webpage as favorite; (b) number of users visiting the web page, either via a search engine or directly; (c) time at which the webpage is visited; (d) duration for which the webpage is visited; and (e) number of times the webpage is revisited (hit count). Similar processing may be adapted to form a specific browsing activity weighting factor, a specific favorite weighting factor or a crawl web page weighting factor.

The internet infrastructure 105 illustrated in FIG. 1 contains the search engine server 169 communicatively coupled to the plurality of client devices 157 through 159 via access points (APs) 121, 122, and 123, ISPNs (Internet Service Provider's Networks) 111 and 112, and an Internet backbone 107. The search engine server 169 contains browser activity gathering module 171 that collects the browser activity information and stores this data in the browser activity database 181. The search engine server 169 also contains favorite list gathering module 173 that collects the favorite lists and related metadata for a user or client and stores this data in the world's favorite database 179. The browser-activity-monitoring module 195 tracks the user's usage of the Internet and temporarily stores trends, usage data, etc., in the client devices 157 through 159. Then, in one embodiment, upon a clicking of a 'send browser activity' button in the web browser 151, the browser-activity-gathering module 171 receives the stored browser activity information and stores it in browser activity database 181 for further processing.

When the search engine server 169 begins interaction with the web browser 151 or a similar application on a client, a search support module (not shown) fills up a favorite list pane or popup window with favorite lists. Therefore, the search interface web page contains options to upload favorite list and related metadata, and browser related activity to the search engine server 169. Then, upon possible user editing/changes and a clicking of a 'send favorite list' button, via the client device 157 or 159, the favorite list gathering module 173 receives the favorite list and related metadata and stores this information in world's favorite database 179 for further processing.

Soon after the favorite list and related metadata, and browser activity information is received, a user profiling module (not specifically shown in FIG. 1) creates a user profile as mentioned in above paragraphs. A trend estimation module (not specifically shown in FIG. 1) retrieves stored information from the world's favorite database 179 and browser activity database 181 and processes this information to create trends, such as recently added websites and high visit volume preferences of the user. A browser-activity-based search result sorting module 175 orders search results or search result web links, selected from the browser activity database 181, on the basis of the search string and by popularity (or some other meaningful characteristic of the search result data). It also reorders the web links selected from crawl webpage database 177 based upon information processed from browser activity database 181 or other user relevance/priority information.

The search interface webpage that is delivered as a first page upon request from the web browser 151 facilitates the user to select between the following options for the current search: (a) search within browser activity database 181 alone; (b) search within world's favorite database 179 alone; (c) search within crawl webpage database 177 alone; (d) search based upon trends based on favorite behavior and browser activity behavior alone; and/or (e) any of the combinations of (a) through (d). In addition, 'send browser activity' and 'send favorite list' buttons allow user to send browser activity information and/or favorite lists and related metadata. The user may also be provided with a helpful tip that lets the user know terms with which the favorite list, trends, user profile, and related metadata, as well as web browser activity information are gathered, stored, shared, and used by the search server engine 169. For example, the helpful tip may be:

"To help us improve our site can you please provide your favorite list and browser activity information? You may edit, include, or delete any web link from the favorite list before sending it to us. We do not invade your privacy; keep records of any of your data including IP address and name."

As an example of a search, a user may enter 'top bicycle riders' as a search string and choose the 'search using browser activity' option to enable searching for search results or search result web links that are associated or correlated strongly with historical user browser activity. Then user may click on 'search' button. The search engine server 169 searches for web links from the browser activity database 181 and delivers search results in one or more of the columns on a display screen of the client device. One or more other columns on the display screen or graphical user interface may have results derived from the crawl webpage database 177. Still another column or columns may have advertisements tailored by using a user profile, derived from the browser activity and favorite lists of the web browser 151, and so on.

Figure 2:
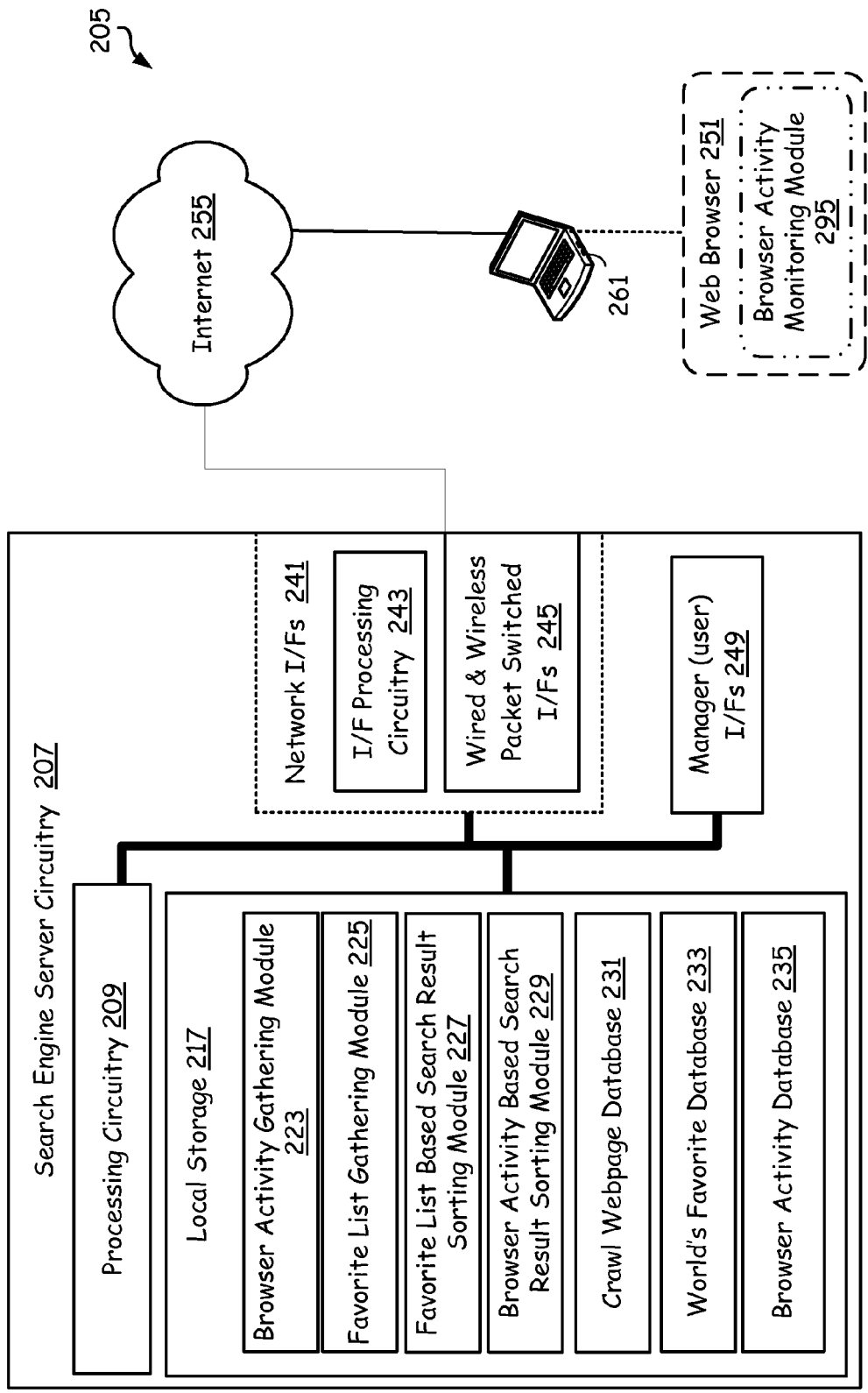
FIG. 2 is a schematic block/step diagram illustrating components of the search engine server constructed in accordance with the embodiment of FIG. 1.

FIG. 2 is a schematic block/step diagram illustrating components of the search engine server constructed in accordance with the embodiment of FIG. 1. The search engine server circuitry 207 may, in part or full, be incorporated into any computing device that is capable of serving as an Internet based server or computer. The search engine server circuitry 207 generally includes processing circuitry 209, local storage 217, manager interfaces 249, and network interfaces 241. These components are communicatively coupled to one another via one or more of a system bus, dedicated communication pathways, or other direct or indirect communication pathways. The processing circuitry 209 may be, in various embodiments, a microprocessor, central processing unit (CPU), a digital signal processor (DSP), a graphics processor, a state machine, an application specific integrated circuit, a field programming gate array, combinations thereof, or other processing circuitry.

The network interfaces 241 contain wired, optical, and/or wireless packet switched interfaces 245 and may also contain built-in or an independent interface processing circuitry 243 (usually another central processing unit of some sort). The network interfaces 241 allow the search engine server 207 to communicate with client devices such as devices 261 and to deliver search result pages of web links. The manager interfaces 249 may include one or more display and keypad interfaces. These manager interfaces 249 allow the user or IT expert at the search engine server 207 to control aspects of the system/server. The client device 261 that is illustrated is communicatively coupled to the search engine server 207 via an Internet 255.

Local storage 217 may be any type of random access memory (RAM), read-only memory (ROM), flash memory, electrically erasable memory, optical storage, magnetic storage, a disk drive or array, an optical drive, any combination thereof, or another type of memory that is operable to store computer instructions and data. The local storage 217 includes a browser activity gathering module 223, favorite list gathering module 225, favorite list based search result sorting module 227, browser activity based search result sorting module 229, crawl webpage database 231, a world's favorite database 233 and a browser activity database 235 to facilitate a user's search in accordance with the teachings herein. The client device 261 is illustrated as being communicatively coupled to the search engine server 207 via the Internet 255 or another communication network of any kind.

The browser-activity-gathering module 223 collects browser activity information and stores this data in the browser activity database 235 on the server. A browser-activity-monitoring module 295 incorporated into web browser 251 tracks the user's usage of Internet and temporarily stores them in the client device 261. In addition, either or both of the client or the server may process and filter the data collected by the browser-activity modules. By performing this processing and filtering, only relevant user activity is processed in a manner that influences search results. So, for example, virus-controlled activity, banned activity, adult content, unwanted ad pop-ups, etc., can be filtered from the data recording in the browser-activity modules and other activity that is highly relevant to the user may even be weighted higher by the modules. Upon clicking of a 'send browser activity' button in the web browser 251 or upon a timed event, a trigger event, or commission of a search, the browser activity gathering module 223 on the server receives the stored browser activity information from the client and stores it in browser activity database 235 for further processing during search operations. The favorite-list-gathering module 225 gathers favorite lists and related metadata from the web browser 251 and stores this data in the world's favorite database 233. This information can be used in addition to the browser activity modules to further refine or advantageously expand search operations and search results. The gathering of favorite list information and related user metadata/profiles occurs during search engine server's 207 interaction with the web browser 251 of the client device 261. However, the client device can be running browser activity data collection from the user at all times or at critical intervals or activities, even when search operations are not being performed and even when the client and server are not communicating with one another. For example, the module 295 on the client may monitor user interaction with locally cached Internet content, email, downloaded software or documents, downloaded content, cached advertising, and other activity to generate user profiles, user data, and user browser activity. Therefore, the browser activity may involve user activity in other applications, like a virus prevention application, an email application, a media processor (e.g., WinDVD or iTunes), and other applications.

The favorite list based search result sorting module 227 orders web links, selected on the basis of search string, often by popularity or some other meaningful characteristic to the user. The browser activity based search result sorting module 229 orders web links, selected from the browser activity database 235, on the basis of the search string and by popularity of some other client-set or server-set characteristic. It also reorders the web links selected from crawl webpage database 231 based upon information processed from browser activity database 235.

In other embodiments, the search engine server 207 of FIG. 2 may include fewer or more components than are illustrated as well as lesser or further functionality. In other words, the illustrated search engine server is meant to merely offer one example of possible functionality, parsing of functionality, and system construction in accordance with one embodiment.

Figure 3:
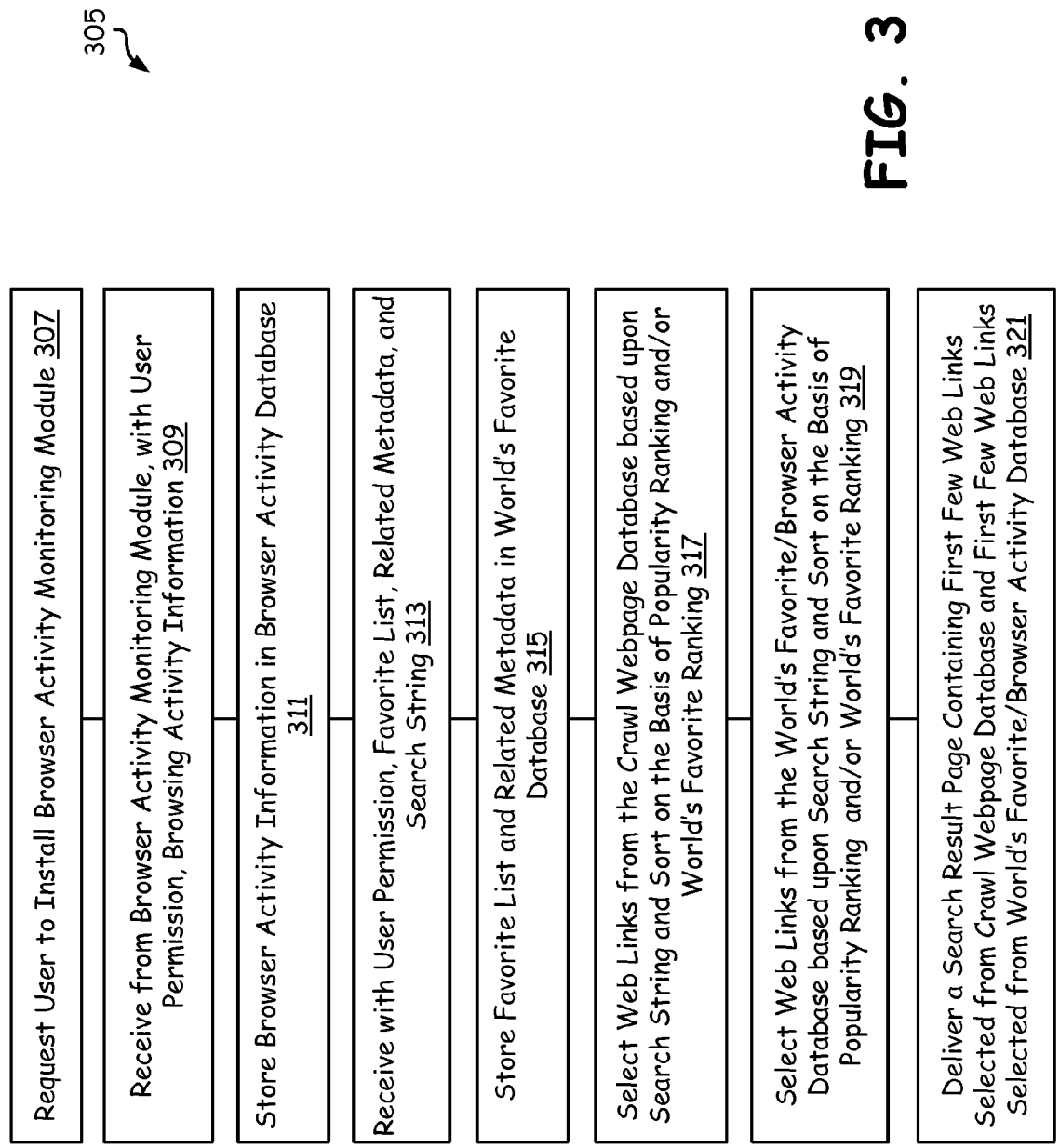
FIG. 3 is a flow diagram illustrating functionality of the search engine server of FIG. 1.

FIG. 3 is a flow diagram illustrating the functionality of the search engine server of FIG. 1. The functionality begins at a block/step 307, where the search engine server requests that the user of the client device install and/or execute the browser activity-monitoring module 295 of FIG. 2. The search engine server or code stored in the application on the client provides all the necessary details and terms and conditions upon which the browser activity monitoring module is installed within the browser of the client device. After installation, the browser activity monitoring module 295 (see FIG. 2) starts tracking user Internet activity and sends this browser activity information periodically, upon trigger events, or upon user request to the server. During one such search interface webpage delivery, the user sends browser activity information (along with or in conjunction with a search string) to the server. The search interface webpage is the first webpage that is delivered to the web browser to initiate a new search. At a next block/step 309, the search engine server receives browsing activity data from the browser activity monitoring module on the client, often with the requirement that the user gives permission for the access or transfer of data and/or the user has a chance to change, edit, delete, or add data to/from the communicated information. Then, at a next block/step 311, the search engine server stores the browser activity information in browser activity database, as shown in FIG. 2.

A separate search support module also sends user or browser favorite list(s) information and related user/client metadata to the search engine server. Again, this part of functionality may occur during delivery of the search interface web page, a search string, or some other function. In the search interface webpage, the search engine server provides an option to upload the favorite list(s) on to an editable window pane or popup window and allows the user to edit, remove, and then send the favorite list along with a search string. At a next block/step 313, the search engine server receives, with user permission (which is often a good idea to enable), the favorite list, and related metadata, along with search string (if a new search is to be initiated). At a next block/step 315, the search engine server stores favorite list and related metadata in a world's favorite database and also constructs one or more user profiles using the collected browser activity information and possibly the favorite lists and related metadata. To construct a user profile, the search engine server uses browser activity information, favorite list information, and the related metadata to create profile data such as: (a) percentages of categories of webpage visits; (b) the times at which web pages are visited; (c) the time and date at which a webpage is added to the favorites list; and (d) the active duration for which a webpage is interacted with, among other related metadata. In addition, before delivery of a search result page, the search engine server processes stored data in the world's favorite database and browser activity database to allow for the monitoring and processing of trends, such as the user access to recently added websites and high visit volume sites/preferences. The user may choose to search, using the search string, within the world's favorite database, within the crawl webpage database, within the browser activity database and/or search using trends to obtain one or more lists of search results or web sites/pages relevant to the user's search needs.

At a next block/step 317, the search engine server selects web links from the crawl webpage database based upon the search string and sorts on the basis of popularity ranking and/or world's favorite ranking (or some other ranking scheme like date, size, etc). The world's favorite ranking is decided by using favorite weighting factor(s) that determines how many users select a webpage as a favorite. The browser activity information may also be used to rank the web links selected. At a next block/step 319, the search engine server selects web links from the world's favorite database and/or browser activity database based upon the search string and sorts on the basis of popularity ranking and/or world's favorite ranking (or some other mechanism). Again, the browser activity information may also be used to rank the web links selected, and as always, multiple two-tier or multi-tier rank-ordered algorithms may be employed. The process of block/step 319 is performed only if the user chooses to search within the world's favorite database or search using browser activity information. At a final block/step 321, the search engine server delivers a first search result page containing one or more of: (a) search results or web links selected and ranked from crawl webpage database; (b) search results or web links selected and ranked from world's favorite database; (c) search results or web links selected and ranked from browser activity database; (d) search results or web links selected from an advertisement database; (e) user profile created using favorite list and related metadata, and browser activity information; (f) trends based on favorite behavior and browser activity behavior; (g) persistence information; and/or (h) any combination of (a) through (g).

Figure 4:
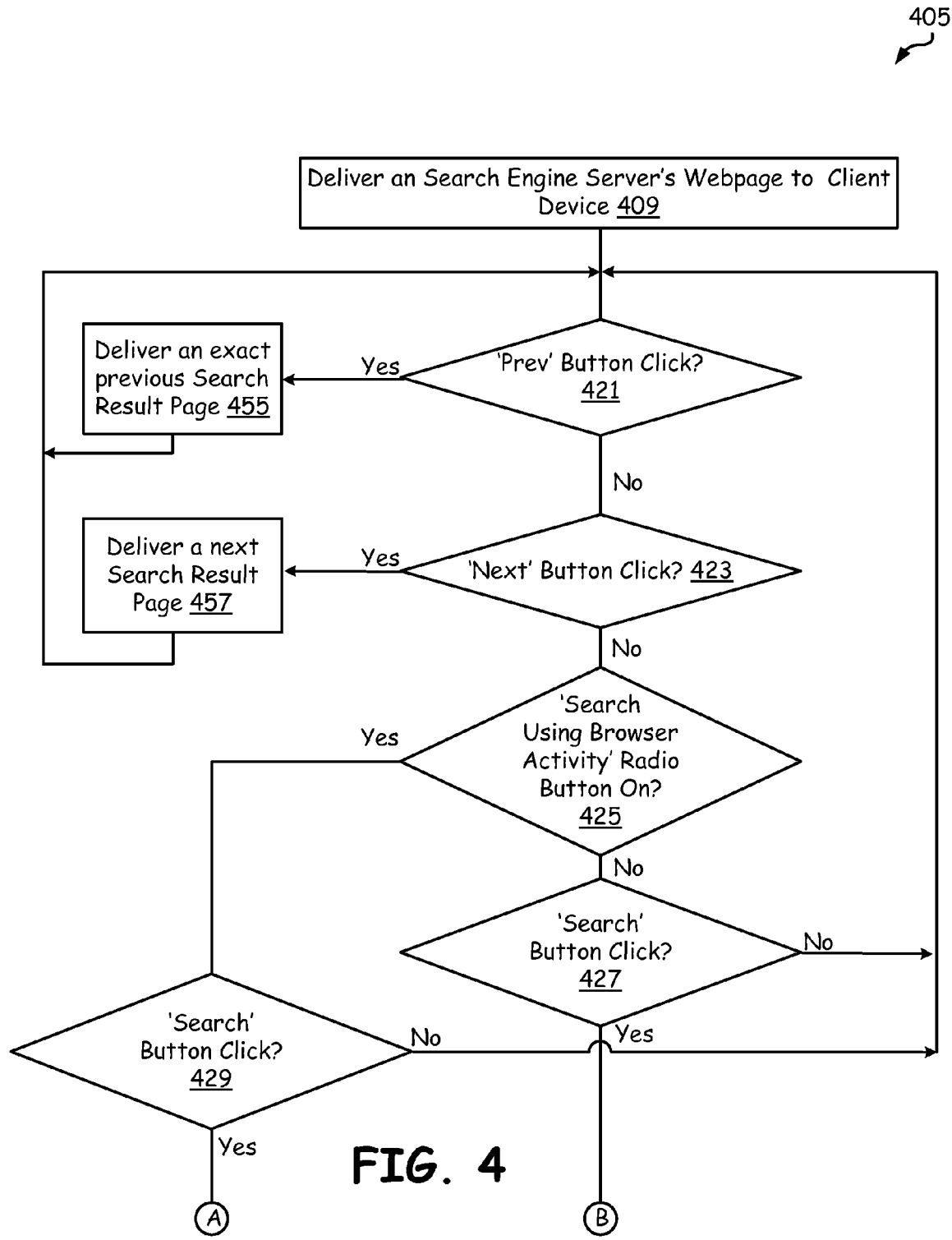
FIGS. 4-5 illustrate a flow diagram showing functionality of the search engine server of FIG. 1 upon delivering a search engine server's webpage, in one embodiment.

FIG. 4 is a flow diagram illustrating the functionality of the search engine server of FIG. 1 upon delivering a search engine server's web page to start a search operation, in accordance with one embodiment. The functionality of the search engine server, in this embodiment, begins at a block/step 409, when a search interface webpage (refer to FIG. 7 for detailed description of a typical search interface web page format) or subsequent search engine server's webpage is delivered. The search interface webpage that initiates a new search using a new search string typically contains provisions to enter a search string and upload favorite list and related metadata, as well as to upload browser activity information between the client and server. Similarly, the subsequent search result pages (one of search engine server's web pages) contain provisions to enter a new or refined search string, as well as 'next' button and 'prev' (or 'previous') button, to continue refinement and processing of search results over time. The search interface webpage or subsequent search engine server's webpage provides user facilities to search using any of the combination of the databases provided by the server and the client, based upon a search string, such as: (a) search using browser activity information; (b) search using favorite lists and related metadata; (c) user profile created from browser activity information, and favorite list and related metadata; and/or (e) trends based upon favorite behavior and browser activity behavior. The browser activity information related search may be selected and performed using a 'search using browser activity' radio button or other selection mechanism within the graphical user interfaces (GUIs) displayed to the user.

At a next decision block/step 421, the search engine server determines if a 'prev' button is clicked. If yes, at a next block/step 455, the search engine server delivers an exact previous search result page and waits for new inputs from the user of the client device. In case of the first search interface web page (when there is no previous data to display), the 'prev' button is not available. If the 'prev' button is not clicked at the decision block/step 421, then, at a next decision block/step 423, the search engine server determines if a 'next' button is clicked. If yes, at a next block/step 457, the search engine server delivers a subsequent search result page. In case of the search interface web page or a last search page, the 'next' button is not available as there is no next page of search results to deliver at this time.

If the 'next' button is not clicked at the decision block/step 423, then, at a next decision block/step 425, the search engine server determines if the 'search using browser activity' radio button is on. If not (if the button is off), the search engine server determines, at a next decision block/step 427, if 'search' button is clicked. If yes at the decision block/step 427, then the search engine server begins processing of a new search criteria, based upon a search string at connector 'B' (refer to the FIG. 5 for continuation of the process/method). If 'search using browser activity' radio button is clicked at the decision block/step 425, then, at a next decision block/step 429, the search engine server determines if a 'search' button is clicked. If yes at the decision block/step 429, then the search engine server begins processing of a new search criteria, based upon a search string and favorites at connector 'A' (refer to the FIG. 5 for continuation of the method via connector A). In another embodiment the options of 'search within favorites' and 'search using trends' may be incorporated using similar process. It is important to note that the order of the decision blocks/steps in FIG. 4 may be changed. It is possible, for example, to poll for a next button before a prev button, and still perform an algorithm that servers the purposes taught herein.

Figure 5:
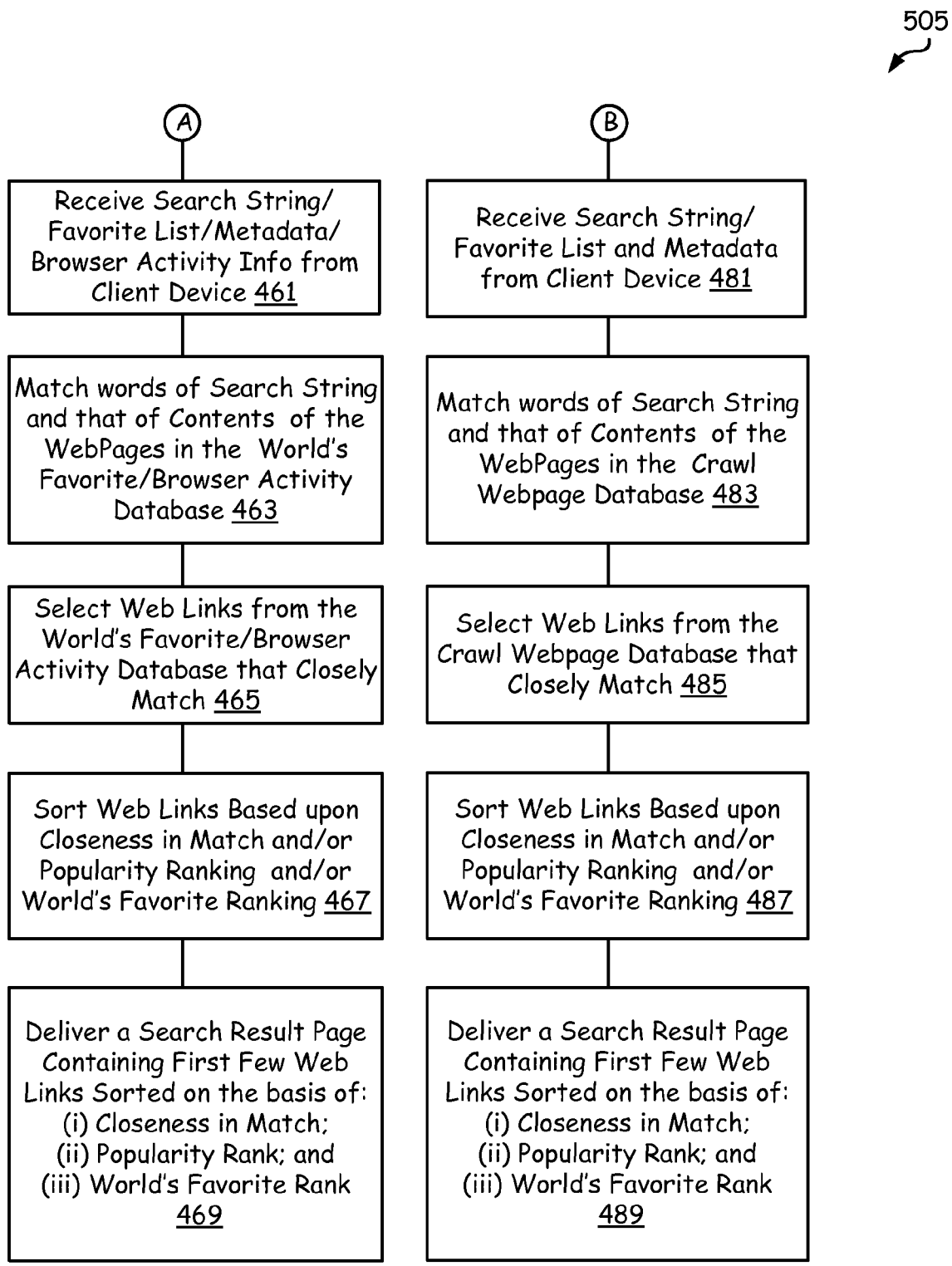

FIG. 5 is a flow diagram illustrating functionality of the search engine server of FIG. 1, continued from connectors 'A' and 'B' as shown in FIG. 4 and FIG. 5. The continued functionality of FIG. 4 at connector 'A' begins at a block/step 461 with the search engine server receiving a search string along with browsing activity information, favorite list, and metadata from client device's web browser. At a next block/step 463, the search engine server matches words, phrases, or parsed data of the search string with that of contents of the web pages in the world's favorite database and/or browser activity database. Then, at a next block/step 465, the search engine server selects web links from the world's favorite database and/or browser activity database, on the basis of closeness in match. At a next block/step 467, the search engine server sorts the selected web links based upon closeness in match and/or popularity and/or world's favorite ranking, etc. The world's favorite ranking is decided based upon a favorite weighting factor that determines how many users select a webpage as their favorite or a favorite. The browser activity information may also be used to sort the web links selected. At a next block/step 469, the search engine server delivers a search result page containing a first few web links sorted on the basis of: (a) closeness in match; (b) popularity rank; and/or (c) world's favorite rank. These combinations may be displayed separately in multiple columns or in a single column on the client display screen. The browser activity ranking based web links may also be presented.

The continued functionality of FIG. 4 at connector 'B' begins at a block/step 481 with the search engine server receiving a search string along with favorite list data and metadata from client device's web browser. At a next block/step 483, the search engine server matches words of the search string with that of contents of the web pages in the crawl webpage database. Then, at a next block/step 485, the search engine server selects web links from the crawl webpage database, on the basis of closeness in match. At a next block/step 487, the search engine server sorts the selected web links based upon closeness in match and/or popularity and/or world's favorite ranking. The browser activity information may also be used to sort the web links selected. At a next block/step 489, the search engine server delivers a search result page containing a first few web links sorted on the basis of: (a) closeness in match; (b) popularity rank; and/or (c) world's favorite rank. These combinations may be displayed separately in multiple columns or in a single column on the display screen or display device located with the client device. The browser activity ranking based web links may also be presented in another column.

Note that the functionality of 'search within favorites', 'search using trends' and also that of user sending the favorite list and metadata to the search engine server are not illustrated in FIGS. 4 and 5, but these features can be combined in any combination to create new modes of searching for search results to improve search result relevance to the user. For other such embodiments the functionality of selecting other search modes or combinations is shown in the snap shot of FIG. 7, as well as other variations (such as displaying mixed search results from various databases), as all such combinations are possible.

Figure 6:
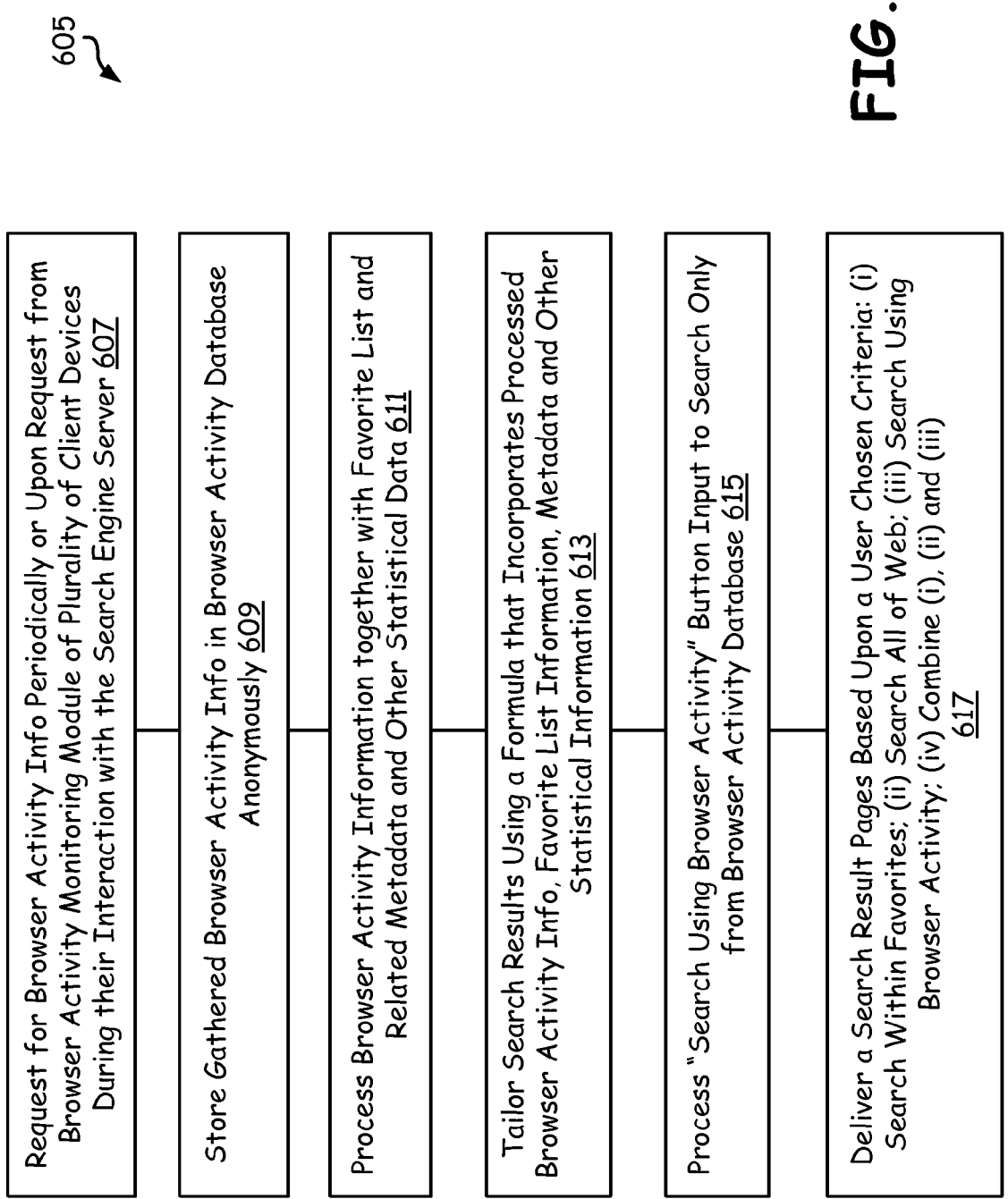
FIG. 6 is a flow diagram illustrating functionality of the search engine server of FIG. 1 wherein the search engine server gathers and processes browser activity information, and delivers web links based upon this data.

FIG. 6 is a flow diagram illustrating a functionality of the search engine server of FIG. 1 wherein the search engine server gathers and processes browser activity information, and delivers web links based upon this data. The functionality of gathering and processing the browser activity information to refine search result lists begins at a block/step 607 where the search engine server requests browser activity information from web browsers of a plurality of client devices periodically, upon trigger events, or upon request from the browser activity monitoring module, during their interaction with the search engine server. The search engine server makes requests for browser activity information periodically from the browser activity-monitoring module located on one or more client devices. The search engine server may also request for browser activity information from the plurality of client devices during delivery of a search interface webpage (refer to the description of FIG. 7). Therefore, there are many mechanisms, timing, and modes that the server and client can use to exchange meaningful user profile, trend data, metadata, browser data, etc., to assist in improving search operations. During the delivery of a search interface web page, the search engine server requests that the user of the client device provide their browser activity information along with favorite lists and related metadata (if selected or needed, and in some embodiments only if authorized and approved by the user). In one embodiment, the search interface webpage contains a window pane that is loaded with user's favorite lists and allows user to add, edit, remove and send them, and button to send browser activity information along with a search string.

Then, at a next block/step 609, the search engine server stores gathered browser activity information in browser activity database in a user-anonymous manner. The search engine server also stores gathered favorite list and related metadata in world's favorite database in an anonymous manner. The user is informed during installation of browser activity monitoring module and collecting of the browser activity information, and favorite list and related metadata that the collection is anonymous and no private data such as IP address and name(s) are collected or used in the process of searching. At a next block/step 611, the search engine server processes the browser activity information along with favorite list and related data with other statistical data. For example, the search engine server may process this data to create a user profile immediately after collection of the data, which is used to reorder, prioritize, select, and omit various search results available for inclusion in the search result list and selectable advertisements to better cater to the needs/desires of the user. Another example is that of creating trends based upon browser activity behavior and favorite behavior that again is used to reorder the search result list and advertisements.

At a next block/step 613, the search engine server tailors and orders the search results using a formula that incorporates processed browser activity information, favorite list and related metadata and other statistical information. The formula may also give certain weight to each of the factors that influence reordering of the search result list, such as user profile, search within favorites, search using browser activity, and search using trends. At a next block/step 615, the search engine server processes 'Search Using Browser Activity' button input (if turned on) to search from browser activity database, 'Search Within Favorites' button input (if turned on) to search from world's favorite database, and 'Search Using Trends' button input (if turned on) to allow recently added and high visit volume preferences to come to the top of the search result list. These radio button selections can be additive or mutually exclusive in different embodiments. A separate set of search result lists may be generated from each of the above radio button selections or the search results from each source can be assembled together and rank-ordered as a single compilation. The search result processing occurs immediately after collecting browser activity information, favorite list and related metadata, and the processing includes selection and sorting from browser activity database and world's favorite database alone and/or sorting on the basis of trends. At a next block/step 617, for each of the search string, browser activity information and favorite list and related metadata received from the plurality of web browsers, the search engine server delivers a search result page based upon a user chosen criteria, which includes: (a) search within favorites; (b) search all of the web; (c) search using browser activity; (d) a combination of (a) and (b). In other embodiments, any combination of the selections (a)-(c) may be used.

Figure 7:
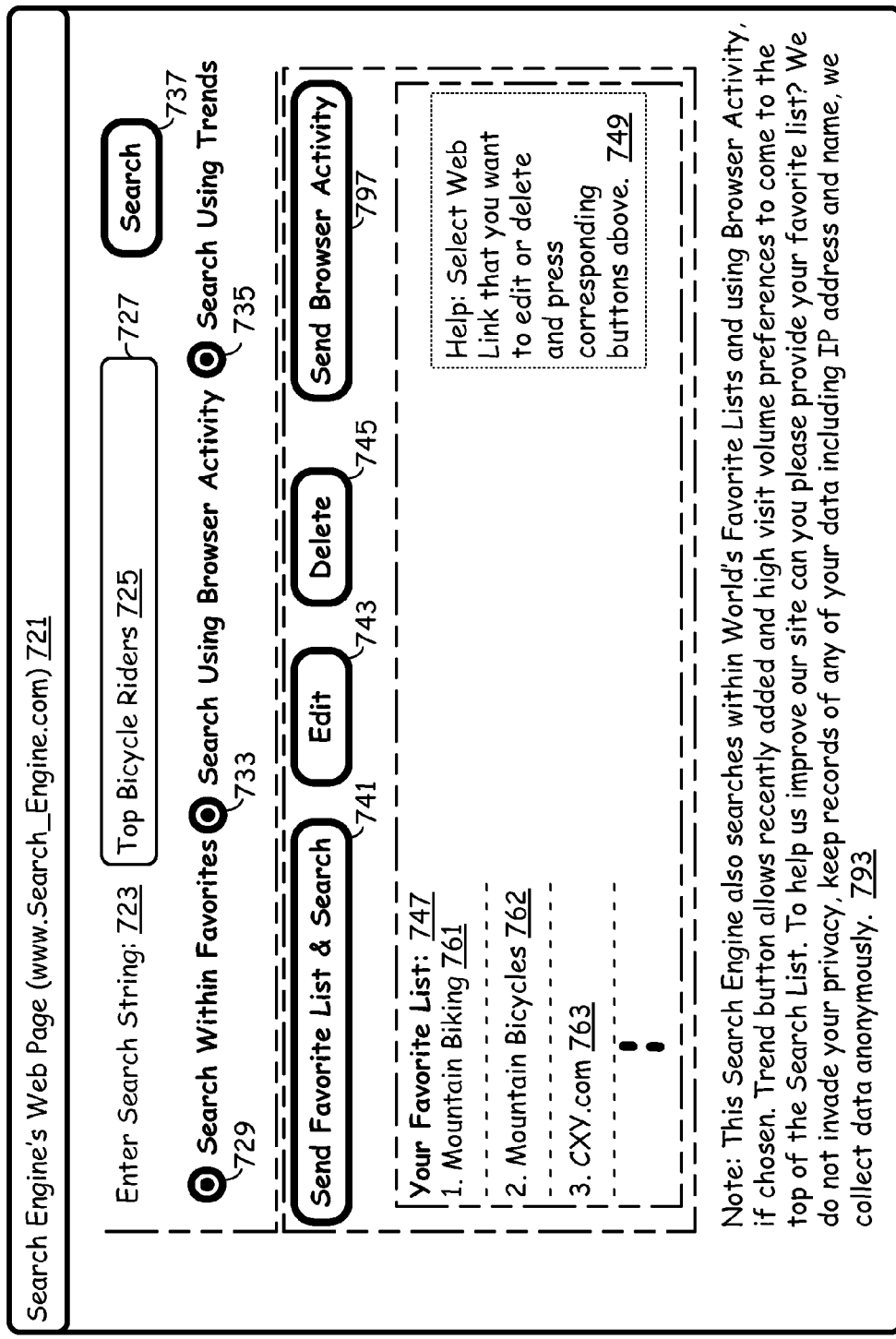
FIG. 7 is a schematic diagram illustrating a snap shot of search interface webpage of the search engine server of FIG. 1, wherein the search interface webpage allows a user to send browser activity information either periodically or when desired, to a server.

FIG. 7 is a schematic diagram illustrating a snap shot of search interface webpage 705 of the search engine server of FIG. 1, wherein the search interface webpage 705 allows a user to send browser activity information either periodically, upon trigger events, or when desired, and provides for user options to enable searching within favorites, search using trends, and/or search using browser activity information. Specifically, the exemplary snap shot illustrated in FIG. 7 shows the search engine server's search interface webpage 705 delivered to web browser 795 of the client device to facilitate user's search and to send browser activity information, and favorite list and related metadata. Note, in other embodiments, the function of providing trends, metadata, browser activity information, etc., can be decoupled from the process of performing a search with a search string. However, for ease of user interface to the server/browser, these two functions are combined together in one page in FIG. 7. The search engine server's search interface webpage 705 may contain a page title such as 'Search Engine's web page (www.Search_Engine.com)' 721, and a 'search' button 737.

Along with 'search' button 737, the search interface webpage 705 also contains 'search within favorites' 729, 'search using browser activity' 733 and 'search using trends' 735 radio buttons or selections in FIG. 7 that help refine the search, in accordance with the embodiments taught herein. The user is able to restrict searches to within browser activity database, world's favorite database and/or search using trends based upon favorite behavior, by using these radio buttons 729, 733, and 735 in FIG. 7. In addition a text such as 'Enter Search String:' 723 and text box 727 are provided to facilitate user's search string/data input. The user may enter the search string in the text box 727, such as 'Top Bicycle Riders' 725, make appropriate choices with buttons and interfaces in FIG. 7 and click on the 'search' 737 button to initiate a new search. The source of search result selection, ordering, etc., will be modified by the server based upon user selections and data input via the screen shown in FIG. 7.

An additional favorite list windowpane is provided for the user to send browser activity information, favorite list, and related metadata, in modified, redacted, expanded, or other forms. The windowpane loads up one or more favorite lists from the web browser automatically, as illustrated in FIG. 7. For example, the windowpane may contain a title such as "Your Favorite List" 747, followed by a list of web links such as links 761 through 763. The windowpane also has button to edit and delete, 'Edit' 743 and 'Delete' 745, content within the lists 747. By using these buttons 743 and 745, the user can add additional web links to the list, delete certain web links from the list, or edit some of the links. Also, a 'Send Favorite List and Search' 741 button allows the user to send favorite list and initiate a new search (based on the search string in the text box 727) at the same time. A 'Send Browser Activity' 797 button allows the user to send browser activity information to the server and use this information to refine selection, ordering, and processing of search results. In another embodiment, the windowpane may allow simultaneous sending of browser activity information, favorite lists, and metadata and search information.

A helping tip within the window pane such as the text "Help: Select Web Link that you want to edit or delete and press corresponding buttons above" 749 helps the user(s) to understand how to edit and send favorite list and related metadata to assist and modify their search operations and results. In addition, a helpful note can be provided that helps the user to understand that the data that is collected anonymously from their client machine to facilitate a better search. This message can be a message such as:

"Note: This Search Engine also searches within World's Favorite Lists and using Browser Activity, if chosen. Trend button allows recently added and high visit volume preferences to come to the top of the Search List. To help us improve our site can you please provide your favorite list? We do not invade your privacy, keep records of any of your data including IP address and name, we collect data anonymously" 793

FIG. 8 is a schematic diagram illustrating a snap shot of a first set/list of search results provided in a first search results page based upon a search string, favorite lists and related metadata, trends and/or browser activity information. Specifically, the exemplary snap shot illustrated in FIG. 8 shows the first search result page 805 as delivered to web browser 895 of the client device. This page is used to facilitate a user's search. The first search result page 805 may contain a page title such as 'Search Engine's web page (www.Search_Engine.com)' 821, and a 'search' button 837. A text such as 'Enter Search String:' 823 and text box 827 are provided to further facilitate user searching. The user may enter the search string in the text box 827, such as 'Top Bicycle Riders' 825, make appropriate choices in the various areas of FIG. 8 and click on the 'search' button 837 to initiate a new or refined search.

The first search result page 805 also contains 'search within favorites' 829, 'search using browser activity' 833 and 'search using trends' 835 radio buttons that help restrict the search to specific data sources, data organization and selection algorithms, and different modes of searching. The user is able to restrict a search to only within browser activity database, world's favorite database and/or search using trends (or any combination thereof) based upon browser activity and favorite behavior, by using the radio buttons 829, 833, and 835 in FIG. 8. The first search result page 805 also contains the 'prev' 885 and 'next' 889 buttons to access prior displayed search result pages and the subsequent search result pages, respectively. A helpful note can be provided to help the user to search in accordance with the present invention. This helpful note can be any not, such as "Note: This Search Engine also searches within World's Favorite Lists and using Browser Activity, if chosen. Trend button allows recently added and high visit volume preferences to come to the top of the Search List" 893

Also, the first search result page 805 may contain in various columns and window panes, web links selected from one or more of: (a) browser activity database; (b) world's favorite database; (c) crawl webpage database; and/or (d) an advertisement database. The columns may also contain web links selected on the basis of: (i) user profile created from browser activity information and favorite list and related metadata; and (ii) trends based on browser activity behavior and favorite behavior. All of the web links thus selected using the above-mentioned criteria may be delivered separately in separate or different search result pages or may be mixed together to form fewer lists and search results pages whereby the data in these pages are mixed from several database sources within the server, to form fewer lists that are delivered in fewer columns or fewer windows. The first search result page 805 illustrated in the exemplary snap shot of FIG. 8 shows two columns, namely, 'Search Results Within World's Favorites' 841 and 'Search Results Using Browser Activity' 843. Each of these columns contains web links selected on the basis of the search string 'Top Bicycle Riders' 825. The columns are segregated in FIG. 8 to display results from specific sources in their own columns, with the sources being from one or more of the crawl web page database, the browser activity database and the world's favorite database. The two columns illustrated in FIG. 8 show web links 1 through 6, as web sites 851 through 856 and web sites 861 through 866, under the columns 'Search Results Within World's Favorites' 841 and 'Search Results Using Browser Activity', respectively. Again, as previously mentioned, the search results can be mixed and ordered together, regardless of search source or database origination. In fact, some entries may be redundant in several databases of FIG. 1, requiring a filtering of some search results to avoid duplication in the search lists.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips (e.g., a multi-core device). Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module may or may not modify the information of a signal and may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building block/steps and method steps (and their order in many some cases) have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building block/steps illustrating the performance of certain significant functions. The boundaries of these functional building block/steps have been arbitrarily defined for convenience of description. Alternate boundaries could be defined as long as any requisite or significant functions of a specific embodiment are appropriately performed in some manner by some structure/method. Similarly, flow diagram block/steps may also have been arbitrarily defined herein to illustrate certain significant functionality. To the extent used, the flow diagram block/step boundaries and sequence could have been defined otherwise and still perform the certain significant functionality. Such alternate definitions of both functional building block/steps and flow diagram block/steps and sequences are thus within the scope and spirit of the claimed invention.

One of average skill in the art will also recognize that the functional building block/steps, and other illustrative block/steps, modules and components herein, can be implemented as illustrated by discrete components, application specific integrated circuits, processors executing appropriate software, software modules, and the like, or any combination thereof. The algorithms taught herein were also focused on user-browser interaction and the use of this data in refining search results found based on a search string. However, a search result list may be derived by processing one more of the following sources of data in addition to the browser interaction database: a user profile data, user historic search patterns, user-client interaction data, client location, the time of day, the search string, user metadata, and user favorites data. Such combinations of two or more sources can even further refine search results to items that are more meaningful to the user.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A computing device adapted to be coupled to a web browser via a communication network, the computing device comprising:
   one or more processing units;
   memory coupled to the one or more processing units; and
   network communication circuitry coupled to the one or more processing units, the one or more processing units, memory, and network communication circuitry are interoperable to:
   process user interaction data regarding user interaction with the web browser over time to derive a browser interaction database including at least one identifier of a web page previously visited by the user, wherein the browser interaction database is also modified by monitoring user interaction with application software other than the web browser;
   process at least one of the user interaction data or the browser interaction database to ensure that only certain of the user interaction data is present in the browser interaction database;

process user favorites data regarding a plurality of users to derive a world's favorite database, wherein the world's favorite database includes favorite web pages visited by the plurality of users;

perform a search operation by:
receiving, via the network communications circuitry, a request for a search result page, the request comprising a search string containing search information and a database selection indicating that the browser interaction database and the world's favorite database are to be searched;
deriving at least one search result list by selecting search results from within the browser interaction database and the world's favorite database to add to the search result list, wherein search results in the at least one search result list correlate appropriately with the search string;
ordering the at least one search result list to place more user-relevant search results higher in a rank order of the at least one search result list; and
delivering, via the network communication circuitry, a search result page including at least a first portion of the at least one search result list external from the computing device for eventual use by the user.

2. The computing device of claim 1 wherein the user favorites data comprises web links and metadata.

3. The computing device of claim 1 wherein the user interaction that is monitored includes one or more of: (i) a time at which a web page is visited; (ii) a duration for which a web page is visited; (iii) recording a kind of interaction performed with a web site; (iv) recording a kind of content accessed in a web site; (v) the amount of clicks or levels of interaction that the user had with a web site; (vi) the number of additional sub-pages visited within a parent web page; and (vii) a number of times a web page is revisited.

4. The computing device of claim 1 wherein the step of processing at least one of the user interaction data or the browser interaction database comprises filtering one or more of the following content from inclusion in the browser interaction database: (i) adult content; (ii) illegal content; (iii) content associated with malware activity; and (iv) quickly closed web pages; (v) unwanted pop-ups; and (vi) unwanted advertisements.

5. The computing device of claim 1 wherein the search result list is derived by processing one more of the following sources of data in addition to the browser interaction database: a user profile data, user historic search patterns, user-client interaction data, client location, the time of day, the search string, user metadata, and user favorites data.

6. The computing device of claim 1 wherein searching is performed using the user favorites data and the browser interaction database, and wherein a user input window is provided to the user to allow the user to inspect and edit the user favorites data before allowing the computing device to have access to the user favorites data.

7. The computing device of claim 1 wherein the search string contains a database selection indicating that a crawl webpage database that is assembled by occasionally crawling a plurality of servers on the communication network to collect or update a large array of web pages in the database, is also to be searched when performing search operations.

8. The computing device of claim 1, wherein the at least one search result list includes a plurality of segregated lists that are segregated based on which database the search results come from.

9. The computing device of claim 1 wherein the search result list is assembled from both the world's favorite database and from the browser interaction database and wherein different weight factors are provided to different data in order to select and order search results.

10. The computing device of claim 1 wherein the browser interaction data is either provided intermittently by the computing device from over the network communication circuitry or is provided at a time when the user is performing a search operation and has provided proper user authorization for the computing device to use the browser interaction data.

11. A server configured to implement a search engine server that delivers web links based upon a search string received from a network communication circuit within the search engine server, the server comprising:
a processing circuitry configured to gather a user's browser activity information periodically and store the user's browser activity information in a browser activity database as stored browser activity information, the stored browser activity information including web page identifiers and activity data gathered from monitoring user interaction with a browser and application software other than the browser;
the processing circuitry configured to gather favorite lists and related metadata related to a plurality of users, and store the favorite lists and the related metadata in a world's favorite database, wherein the favorite lists and the related metadata include identifiers of favorite web pages visited by the plurality of users;
the processing circuitry configured to select and sort search results for a given search string using the browser activity database and the world's favorite database;
a communication circuitry configured to receive the search string, the user's browser activity information, the favorite lists, and the related metadata; and
the communication circuitry further configured to deliver at least a portion of the search results obtained using the browser activity database, and at least a portion of the search results obtained using the world's favorite database for user processing within a single search result page.

12. The server of claim 11, wherein the single search result page comprises a 'search using browser activity' button.

13. The server of claim 11, wherein the search result page comprises a 'search using trends' button.

14. The server of claim 13, wherein the search engine server responds to the clicking of the 'search using trends' button by delivering a search result page containing some of the search results selected on the basis of user use trends, wherein the user use trends are determined based on the stored browser activity information, the favorite lists, and the related metadata.

15. A method performed by a search engine server that supports delivering of search result web links based upon a search string, the method comprising:
requesting delivery of browser activity information periodically from a plurality of web browsers during their interaction with the search engine server, the browser activity information including web links gathered from monitoring user interaction with the web browsers and application software other than the web-browsers;
receiving the browser activity information from the web browsers external to the search engine server;
storing the browser activity information in a browser activity database;
processing the browser activity information stored in the browser activity database to create a meaningful set of data that accurately represents high-relevance user interaction with Internet, the meaningful set of data including web links visited often by a user;

receiving, over time, delivery of favorite lists and related metadata from a plurality of web browsers, during their interaction with the search engine server, the favorite lists and related metadata including favorite web links visited by a plurality of users;

storing the favorite lists and the related metadata in a world's favorite database;

performing a search operation by:

in response to receiving a search request including a search string, recent browser activity information, and recent favorite lists and related metadata:

updating the browser activity database and the world's favorite database with the recent browser information and the recent favorites lists and related metadata, creating a search result list by selecting, from the browser activity database and the world's favorite database, web links that correspond to the search string, and delivering a portion of the result list including web links from the browser activity database, and a portion of the result list including web links from the world's favorite database a search result page.

* * * * *